United States Patent [19]

Eames

[11] Patent Number: 4,730,416
[45] Date of Patent: Mar. 15, 1988

[54] PERIMETER SEAL AND SEALING SYSTEM

[75] Inventor: David G. Eames, Coalville, England

[73] Assignee: Schlegel (UK) Holdings Limited, Seacroft, England

[21] Appl. No.: 904,568

[22] Filed: Sep. 8, 1986

[30] Foreign Application Priority Data

Sep. 23, 1985 [GB] United Kingdom ............. 8523443

[51] Int. Cl.⁴ .............................................. E06B 7/16
[52] U.S. Cl. ........................................ 49/493; 49/492
[58] Field of Search .................. 49/493, 492, 494, 506

[56] References Cited

U.S. PATENT DOCUMENTS

| | | | |
|---|---|---|---|
| 2,657,438 | 11/1953 | Spraragen | 49/492 |
| 3,112,536 | 12/1963 | Gagnier | 49/492 |
| 3,153,265 | 10/1964 | Hosea et al. | 49/492 X |
| 3,213,494 | 10/1965 | Mayers et al. | 49/492 |
| 3,309,817 | 3/1967 | Fisher | 49/493 X |
| 3,382,619 | 5/1968 | Bemis | 49/493 |

Primary Examiner—Philip C. Kannan
Attorney, Agent, or Firm—Cumpston & Shaw

[57] ABSTRACT

A seal for sealing the gap between a door opening (1) and a door of a motor vehicle, the seal having a fixing portion (5) incorporating a carrier (9) which is preferably formed of wire bent into a zig-zag and held in that configuration by stitching or knitting (13), the carrier being incorporated in the fixing portion during extrusion of the seal which is also provided with a sealing portion (7) which may be formed of a different hardness from the fixing portion (5). A central region of the carrier (9) is not embedded in the material of the fixing portion so that wefts of limbs (11) of the zig-zag carrier are exposed so that the seal can be attached to either the door frame of the vehicle or the door itself by means of a plurality of large headed studs (3) welded to the frame or door, with the heads of the studs being engaged behind two adjacent limbs of the carrier and with the stem of the stud extending between said limbs.

The invention also relates to a sealing system incorporating the seal and studs and to a method of forming a seal.

11 Claims, 2 Drawing Figures

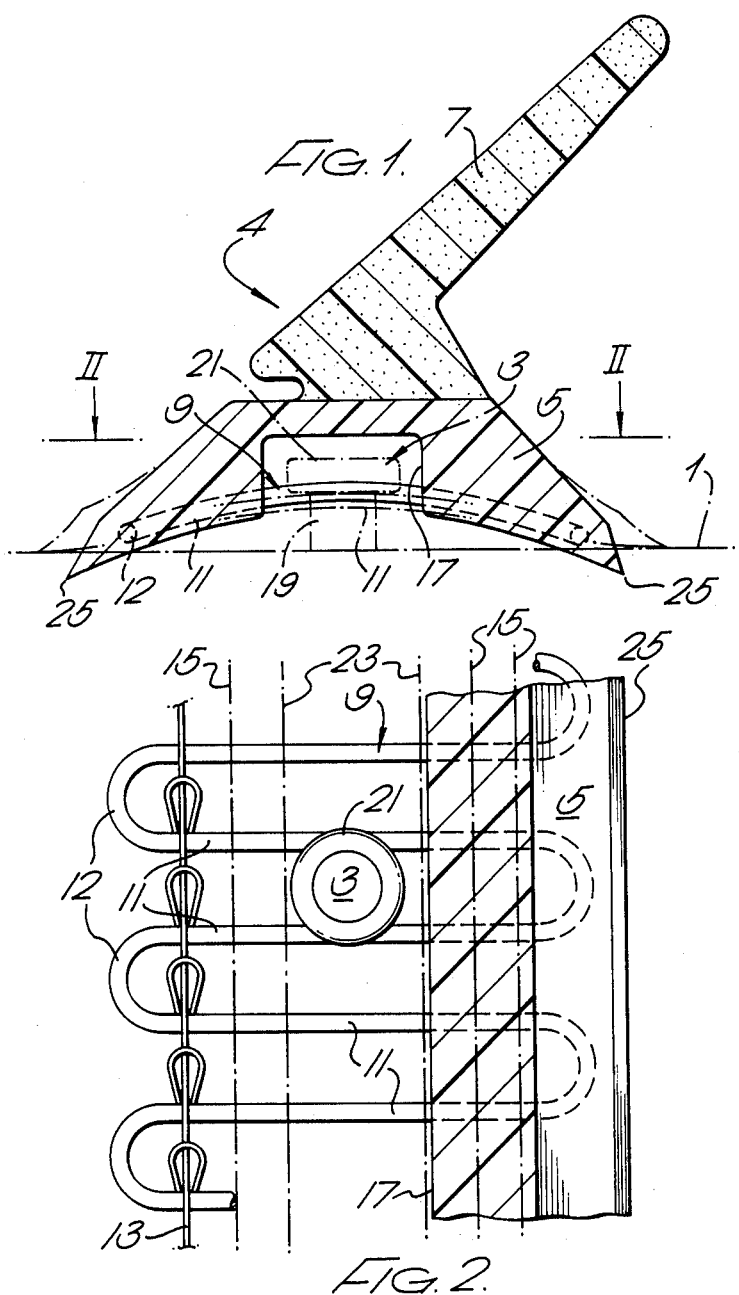

PERIMETER SEAL AND SEALING SYSTEM

This invention relates to a perimeter seal and sealing system, which is particularly suitable for use in motor vehicles, and to a method of forming a seal between two members, such as between a vehicle door and the door opening.

One type of door seal for motor vehicles has a fixing portion, from which a sealing portion extends, which fixing portion is located in a 'C' (shaped) channel on the perimeter of the door, or possibly the perimeter of the door opening. Other methods for fixing such seals in position include using adhesive or two-sided tape, or plastics pegs engaging in apertures in the base of the channel, a flange on the door or perimeter of the door opening; however, such methods suffer from the following disadvantages:

(a) On assembly the operator tends to damage the painted surface of the 'C' channel, therefore starting a rusting cycle.

(b) The base of the 'C' channel cannot be successfully sealed against water ingress therefore allowing a potential leak situation to exist at all times.

(c) When using plastic pegs, the operation of punching holes is difficult. Furthermore, the frequency of pegs required to give a reasonable retention is impractical. Peg mounted seals also tend to "cross corners", therefore reducing the satisfactory functioning of the seal.

(d) Two-sided tape and adhesive give problems on assembly and the serviceability gives grave problems.

(e) Rolled sections of metalwork are expensive to form and not very rigid and it is preferred to retain the "meatplate" approach of door construction to ensure the best build tolerance situation, i.e. to manufacture the door from two spaced dish-shaped components which are welded together around their edge flanges.

The present invention therefore seeks to provide a seal and sealing system which overcomes the above disadvantages, and which gives the opportunity for the seal to be as far outboard of the aperture as possible and thereby offer optimum sealing and noise reduction efficiency. Further, the invention also seeks to provide a seal which is easy to install onto the vehicle and has good retention after fitting, and ensures minimum damage, in the fitting process, to metalwork and which also makes the best use of the latest manufacturing equipment, i.e. robots, for the assembly of the metalwork areas on the vehicle.

According to the present invention, we provide a seal suitable for use as a door seal in a motor vehicle, said seal having a fixing portion and a sealing portion wherein a resiliently deformable carrier is located at least partly in the fixing portion, said carrier having a plurality of resiliently deformable limbs extending transversely of the seal throughout its length, and between adjacent ones of which the head of a stud may be forced during fitting of the seal so that the seal can be fitted to a part to which the or each stud is connected, and secured to the part by engagement between the head and a pair of the deformable limbs.

Preferably, the seal is extruded from one or more polymeric materials, and the carrier is embedded in the fixing portion, which may be formed of a different material from that of the sealing portion. Preferably also, the carrier extends across substantially the whole width of the fixing portion, with a region of the carrier not being embedded in the polymeric material of the fixing portion so that the studs can be forced easily between adjacent limbs of the carrier.

It is important that the durometer of the polymeric material of the fixing portion is sufficiently high to hold the fixing portion firmly against the vehicle body (or door) throughout the length of the seal. However, it should be low enough to allow the seal to be bent around corners, e.g. of a door opening.

Preferably, the carrier is formed of wire formed into a zig-zag configuration with generally parallel limbs, any adjacent pair of which is joined together by a U-shaped edge portion of the carrier, and which limbs provide wefts which are held in their generally parallel configuration in known manner by parallel spaced warps knitted into the wefts. The carrier may be of the type disclosed in European Patent Application No. 83303150.3 or 84306335.5.

Preferably, the wire is formed of a highly corrosion-resistant material such as stainless steel.

Also according to the present invention, we provide a sealing system comprising a seal as described above, and a plurality of studs having enlarged heads, wherein the studs are secured to one of the parts between which the seal is required with their heads projecting from said one part, and said seal is engaged with said studs with the heads of the studs being entrapped between adjacent limbs of the carrier.

The invention also extends to a method of attaching a seal to a member, and in its broadest sense, comprises the steps of attaching a plurality of headed studs to the member, and then attaching the seal, which incorporates a carrier therein, which has a plurality of resiliently deformable limbs, to the studs by passing the heads of the studs between respective adjacent pairs of limbs of the carrier.

The invention is now described by way of example with reference to the accompanying drawings, in which:

FIG. 1 is a typical transverse section through a seal; and

FIG. 2 is a section on the line II—II of FIG. 1 with some of the material of the seal omitted for the sake of clarity, and showing the position which a head of a stud would occupy when the seal is fixed in position as shown by the chain line outline in FIG. 1.

Referring to the drawings, 1 represents the surface of a flange, e.g. around a door opening in a motor vehicle, to which a plurality of enlarged headed studs 3 have been welded, by means of which a seal 4 may be attached to the vehicle around the door opening. A particularly suitable make of stud is that produced by Tucker Fasteners. The stud is T-shaped and is made from stainless steel thus reducing the possibility of corrosion if slightly damaged on assembly. The stud is welded onto the metalwork of the vehicle with the use of an automatic welding system carried by a robot. This means that the stud can be orientated in any required position, the only restriction being the size of the welding head which at the present time is 18 mm in diameter. The dimension between the base of the stud head and the surface of the vehicle metalwork can vary, a typical dimension being from 2.5 mm to 2.3 mm. The diameter of the head and the shaft of the stud are important, as will be described, but typically the head diameter could be 5.05 mm ±0.5 mm and the shank diameter 3.0 mm ±0.5 mm. The overall design of the head of the stud may include a tapered condition to ease assembly.

The seal 4 is extruded from one or more polymeric materials and has a fixing portion 5, a sealing portion 7 and partially embedded in the fixing portion 5 is a knitted wire carrier 9.

The wire carrier 9 acts as a reinforcement for the fixing portion 5 or base of the seal 4 to maintain the integrity of the seal when negotiating complex or sharp radii, e.g. around door openings, and is also the prime means for fixing the seal 4 to the flange 1 of the vehicle. The wire carrier 9 is shown in FIG. 2, and comprises wire bent into a zig-zag formation so as to have a plurality of generally parallel limbs or wefts 11, connected together at their ends by U-shaped edge portions 12. Obviously, the opposite ends of each limb to those illustrated in FIG. 2 will be connected not to the ones illustrated but to its adjacent limb on the opposite side of the one shown as being joined by a U-shaped edge portion 12 (see top right hand corner of FIG. 2). The wefts 11 are maintained in their illustrated position by means of a plurality of generally parallel warps 13, only one of which is shown in full, connected by a known knitting or knotting process to each limbs 11. Other warps are represented by the broken lines 15.

As can be seen from the drawings, the polymeric material of the fixing portion is extruded only over the edge regions of the carrier 9, leaving a rectangular sectioned central channel 17 across which the carrier 9 extends. This channel is somewhat wider than the heads of the T studs 3, so that the shanks 19 of the studs can be located between adjacent limbs of the wire, with the heads 21 holding the seal on the studs 3. The wire carrier can include "phantom warps" 23 to allow the centre section of the wire to be warp free when the section is extruded and thus allow the studs to be inserted freely between the limbs 11. This can be achieved by forming these of a material which melts during extrusion of the seal (such as polypropylene). It will be appreciated that the frequency of limbs 11, i.e. their spacing, is determined by the size of the T stud to be used and for studs of the above-mentioned diameter, there are about six limbs 11 per inch.

The material of the wire should be corrosion resistant to ensure that no corrosion takes place in service because the wire will be the only fixing medium so a failure would be unacceptable. The wire must be malleable enough to be formed easily but on application have sufficient resistance to bending to produce the required retention characteristics.

A typical diameter for the wire is 0.76 mm but this may be varied, and the width of the wire carrier is about 22 mm, but obviously the width can be varied according to the actual requirement.

In the illustrated seal, the wire carrier is encapsulated by an elastomeric polymer compound (possibly based on EPDM rubber) which forms the base or fixing portion 5 of the seal. This provides a good seal against the face of the flange. The seal is improved by having sharp edges 25 on each edge of the fixing portion 5. The grade of polymeric compound must exhibit sufficient flexibility to negotiate corners. Ideally, the compound should have a durometer which is sufficiently high to hold the seal throughout its length against the vehicle body (with the aid of the carrier 9). In many instances the seal will have to be bent around corners of door openings, and for such seals, the durometer of the compound should be low enough to permit such bending without detracting from the other requirements of the seal.

The sealing portion 7 is illustrated in the form of a polymeric sponge lip, but it will be appreciated that many other different constructions could form the sealing portion to seal between the two moving parts of the structure of the vehicle, i.e. door and body. This part of the seal needs to be flexible enough to conform to the variations experienced in practice, e.g. (a) a nominal door gap of 16 mm, (b) an unpainted body build tolerance of ±2 mm, (c) a high speed "suck out" condition of +3 mm, i.e. the seal must be sufficient to maintain a seal between vehicle door edge and door opening even at high speeds when there can be a tendency for the door to move outwards around its periphery by up to 3 mm.

The sealing portion 7 is co-extruded with the fixing portion 5 and the wire center 9 and has to be of sufficient softness to conform easily to the body variations and give acceptable door shut efforts but have sufficient modulus to provide a seal.

Obviously, the above described seal is just one possible example incorporating the invention. The shape and size of the sealing and fixing portions 7 and 5 could be quite different, as could their relative positions. Likewise, the studs could be of a different shape. Furthermore, it is envisaged that non-extruded seals could be used, e.g. the carrier 9 could be covered with textile or other material, or uncovered, and hidden, for example by a textile or pile sealing portion. Furthermore, it is not essential that the studs 3 should engage a central region of the carrier 9.

It is also envisaged that the carier 9 could be of a different construction to that illustrated. While it is preferably formed of knitted wire, it might be possible to use some constructions of slotted metal carrier, for example.

The seal of the present invention allows vehicle manufacturers to fix the T studs 3 to the vehicle with robots to allow flexibility of design, ease of manufacture and consistency of process. Furthermore, the invention allows the use of current wire carrier technology in a novel form to allow ease of seal fitment with good retention characteristics for the seal, i.e. the wire carrier has the new task of holding the seal on the studs.

Another advantage is the elimination of the recurring corrosion problems experienced by traditional methods of seal fixing systems, and yet a highly flexible seal is provided, which is easy to fix in position.

It will of course be understood that the present invention has been described above purely by way of example, and modifications of detail can be made within the scope of the invention.

What is claimed is:

1. A seal suitable for use as a door seal in a motor vehicle, said seal having a fixing portion and a sealing portion and wherein the fixing portion comprises a resiliently deformable carrier located at least partly in a polymeric material, said carrier having a plurality of resiliently deformable limbs extending transversely of the fixing portion throughout its length, and wherein a channel is formed in said polymeric material, extending lengthwise of the seal, and on either side of said carrier, thereby exposing the carrier in the location of the channel, and wherein the spacing between adjacent limbs of said carrier is such that an enlarged head of a stud may be forced between adjacent limbs during fitting of the seal so that the seal can be fitted to a part to which the stud is connected, and secured to the part by engagement between the underside of said head and said adjacent deformable limbs.

2. A seal according to claim 1, wherein said carrier region is located centrally of said fixing portion.

3. A seal according to claim 1, wherein said carrier is formed of wire formed into a zig-zag configuration with generally parallel limbs providing said resiliently deformable limbs, a U-shaped edge portion of said carrier joining together any adjacent pair of said limbs, and which limbs provide wefts, and including parallel spaced warps knitted into said wefts, which hold said wefts in their generally parallel configuration.

4. A seal according to claim 3, wherein said wire is formed of a highly corrosion-resistant material.

5. A seal according to claim 1 which is extruded from two different polymeric materials with the carrier being located just within said fixing portion.

6. A seal according to claim 1 wherein said fixing portion is formed of a harder polymeric material than that of said sealing portion.

7. A seal according to claim 1 wherein said carrier extends across substantially the whole width of said fixing portion.

8. A sealing system comprising a sealing member for forming a seal between two relatively movable parts, and a plurality of studs having enlarged heads, the studs being secured to one of the parts between which the seal is required, with their heads projecting from said one part, prior to engagement of said sealing member with said one part, and a sealing member comprising a fixing portion, a sealing portion and a resiliently deformable carrier located at least partly in said fixing portion, said carrier having a plurality of resiliently deformable limbs extending transversely of the sealing member throughout its length, said sealing member being engaged with said studs with said studs being entrapped between adjacent limbs of said carrier.

9. A sealing system according to claim 8, wherein said carrier is formed of wire formed into a zig-zag configuration with generally parallel wefts and U-shaped portions along each edge of the carrier, said U-shaped portions joining together the ends of said wefts and including knitted warps joining said wefts between said ends, said sealing member being extruded from at least one polymeric material in which said carrier is embedded except for a central region thereof, with which region said studs engage.

10. A sealing system according to claim 9 wherein said central region is defined by a channel in said polymeric material, the said limbs extending across said channel and said heads of said studs being located in the channel on the side of said limbs remote from said one part.

11. A method of attaching a seal to a member, said seal incorporating a carrier therein, which has a plurality of exposed resiliently deformable limbs extending transversely of said seal throughout its length, comprising the steps of attaching a plurality of studs with enlarged heads to said member, and then attaching said seal to said studs by passing said heads of said studs between respective adjacent pairs of limbs of said carrier, the spacing between adjacent ones of said limbs being such that the heads of said studs may be forced between adjacent ones of said limbs during fitting of said sealing members to said one part, said seal being secured to said member by the underside of said heads engaging said limbs.

* * * * *

UNITED STATES PATENT AND TRADEMARK OFFICE
CERTIFICATE OF CORRECTION

PATENT NO. : 4,730,416

DATED : March 15, 1988

INVENTOR(S) : David G. Eames

It is certified that error appears in the above-identified patent and that said Letters Patent is hereby corrected as shown below:

Column 5, lines 3 and 4, delete "carrier region" and insert --channel--.

Signed and Sealed this

Thirty-first Day of July, 1990

Attest:

Attesting Officer

HARRY F. MANBECK, JR.

Commissioner of Patents and Trademarks